United States Patent [19]
Stanton

[11] 3,791,921
[45] Feb. 12, 1974

[54] METHOD OF BREEDING FISSILE FUEL IN A COUPLED NUCLEAR REACTOR

[75] Inventor: Richard Myles Stanton, Canton, Mass.

[73] Assignee: Research Corporation, New York, N.Y.

[22] Filed: Mar. 10, 1972

[21] Appl. No.: 233,824

Related U.S. Application Data

[63] Continuation of Ser. No. 858,851, Sept. 17, 1969.

[52] U.S. Cl.......................... 176/17, 176/41, 176/40
[51] Int. Cl............................................ G21c 1/00
[58] Field of Search ..................... 176/17, 40, 41, 42

[56] References Cited
UNITED STATES PATENTS

| | | | |
|---|---|---|---|
| 2,440,999 | 5/1948 | Anderson | 252/301.1 |
| 3,183,356 | 5/1965 | Cherubini | 313/61 X |
| 3,093,563 | 6/1963 | Menke | 176/17 |
| 3,152,958 | 10/1964 | Allen | 176/1 |
| 3,526,575 | 9/1970 | Bennett | 176/1 |
| 3,117,912 | 1/1964 | Imhoff et al. | 176/5 |

OTHER PUBLICATIONS

Chiang, Frank Chiang, Nuclear Science Abstracts No. 24182, Vol. 23, No. 13, 1968.

Randen K., Nuclear Science Abstracts, No. 32672, Vol. 20, No. 17, Dec. 16, 1965.

*Primary Examiner*—Reuben Epstein
*Attorney, Agent, or Firm*—Cooper, Dunham, Clark, Griffin & Moran

[57] ABSTRACT

A nuclear fuel for incorporation into the fast region of a coupled nuclear reactor to provide power and breeding of additional fissile fuel comprising a heterogeneous mixture or grouping of a fertile material with lithium and an isotope of hydrogen. The absorption of thermal neutrons by the lithium-6 isotope in the lithium causes the isotope to break up into helium ($He^4$), and tritons ($H^3$) with an energy of about 2.8 MeV. The fusing of the tritons, so produced, with the hydrogen isotope, which may be in the form of deuterium or tritium, forms further helium and releases fusion neutrons with energies in the range from 10 to 20 MeV. The latter high energy neutrons produce direct fission of the fertile material, e. g., $U^{238}$ or $Th^{232}$, releasing about 3.5 neutrons per fission and 200 MeV. energy. The heat produced by these reactions may be used for power and the remaining fertile material is rendered fissile by final neutron capture, thus breeding additional fissile fuel.

10 Claims, No Drawings

METHOD OF BREEDING FISSILE FUEL IN A COUPLED NUCLEAR REACTOR

This is a continuation of application, Ser. No. 858,851 filed Sept. 17, 1969.

BACKGROUND OF THE INVENTION

The present invention relates to a nuclear power source and more particularly to a nuclear fuel for use in the "fast" region of a coupled nuclear reactor system.

A coupled reactor is one which is divided into at least two separate core regions, each containing a different composition of nuclear fuel material. In one region the distribution of neutron energies is "fast," that is, above the range equivalent to thermal excitation and in the other region, the neutron energies are "slow" or generally in the thermal range. Neither region by itself is capable of maintaining a self-sustained neutron-type chain reaction, however, when the regions are combined, or coupled as a unit, criticality may be achieved to provide an operative nuclear power plant.

Reactors of this type are more fully disclosed and discussed in U.S. Pat. No. 3,093,563, issued on June 11, 1963 to John R. Menke.

The nuclear fuel of the present invention is intended for use in the "fast" region of such reactors and provides substantial heat for power production. In addition, the fuel includes a fertile material from which additional fissile fuel is bred without the direct admixture of any fissile material into the "fast" region of the reactor system. A "fertile" material is one which can be rendered "fissile" by neutron absorption, for example, $U^{238}$ and $Th^{232}$, and a "fissile" material is one which is fissionable by slow neutron capture.

The use of the present fuel material is thus of advantage in providing added ability to fully exploit non-fissile fuel reserves, such as uranium and thorium, by inducing direct fission of these elements. Considerable power production is obtained while simultaneously creating new sources of fissile fuel suitable for future use in nuclear power reactors, and achieving a significant reduction in fuel cycle complexity and cost.

SUMMARY OF THE INVENTION

The fuel material of the present invention is of a fission-fusion type and essentially comprises a heterogeneous mixture or grouping of a fertile material with lithium and a heavy isotope of hydrogen.

It has been determined both theoretically and experimentally that a suitable ratio of thermal neutrons absorbed to fusion neutrons produced can be established within this fuel using the proper concentrations, sufficient to sustain a desired chain reaction within a coupled reactor.

To establish the desired neutron economy, the proportions of the lithium-6 atoms and the atoms of the hydrogen isotope are adjusted so that the rate of thermal neutron absorption by the lithium-6 atoms as compared to the rate of fast neutrons produced by the subsequent triton fusion with the heavy hydrogen isotope approaches a ratio of one to one. The concentration of the fertile atoms in the mixture is also adjusted so that the likelihood of absorption of thermal neutrons by the fertile atoms and by the lithium-6 atoms is approximately equal.

The fuel, using, for example, dilute lithium deuteroxide and $U^{238}$, is placed in the "fast" region of the reactor and the absorption of thermal neutrons from the "slow" region causes the ($Li^6$) isotope in the lithium to break up into helium ($He^4$) and tritons ($H^3$) with a total energy release of about 4.8 MeV. The tritons ($H^3$), which acquire an energy of about 2.8 MeV. in turn, fuse with the deuterium ($H^2$) forming helium ($He^4$) and releasing a fusion neutron and about 17.6 MeV. total energy. The latter fusion neutrons acquire energies of about 14.1 MeV. and produce direct fission of the $U^{238}$ releasing about 3.5 neutrons per fission and 200 MeV. energy. Thus, considerable heat is produced which may be used for power and the remaining fertile material is rendered fissile by final neutron capture so that the reactor also acts as a breeder.

DETAILED DESCRIPTION OF THE INVENTION

The fuel of the present invention is of a fission-fusion type and may comprise, within limits readily determinable by those skilled in the art in view of the disclosure, any heterogeneous mixture of materials essentially containing a supply of lithium-6 atoms, deuterium or tritium atoms, and atoms which can be rendered fissile by neutron absorption. For the purpose of our description we shall consider such a mixture particularly containing a dilute solution of lithium deuteroxide and depleted uranium or thorium.

Firstly, from a theoretical standpoint, the combination of dilute lithium deuteroxide with depleted uranium or thorium will produce the following set of exoergic reactions:

(A) the thermal neutron induced reaction,

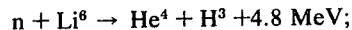

with 2.8 MeV. being imparted to the triton ($H^3$) and 2.0 MeV. associated with the alpha particle ($He^4$);

(B) the triton-induced fusion reaction, $H^3 + H^2 \rightarrow He^4 + n + 17.6$ MeV; with 14.1 MeV. being imparted to the neutron (n) and 3.5 MeV. leaving with the alpha particle ($He^4$); and (C) the non-elastic (n, 2n) and threshold fission reaction for the fertile elements:

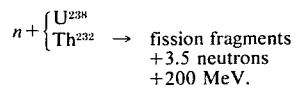

Uncollided neutrons stemming from the fusion of 2.8 Mev. tritons with deuterium, via the (B) reaction, $H^3$ ($H^2$, $He^4$)n, in dilute lithium deuteroxide, acquire an energy span of 10–20 MeV., with the most probable neutron energy from this fusion reaction occurring within the neighborhood of 14 MeV. Capture by fission and a non-elastic (n, 2n) process are the dominant modes for neutron interaction with energies between 10 – 20 MeV. for uranium and thorium as in reaction (C). Fusion neutrons which lie within the 10-20 MeV. range of neutron energies are each capable of yielding 3-4 more neutrons following their capture by fission and non-elastic (n, 2n) absorptions by the heavy elements uranium and thorium. The microscopic cross-section for these two modes of fast neutron capture ranges between 1 – 2 barns when averaged over the spectrum of available fusion neutron energies.

In the meantime, those neutrons which have been born both by fission and non-elastic (n, 2n) reactions (following the final capture of a fusion neutron in either $U^{238}$ or $Th^{232}$) also have a 2–6 barn microscopic cross-section for their eventual (n,γ) capture by the same heavy elements following their slowing down to thermal energies after moderation.

In order to maintain a properly balanced neutron economy within the fission-fusion fuel lattice, then, the rate of thermal neutron absorptions by the (A) reaction, n ($Li^6$, $He^4$)$H^3$, should be nearly equal to the rate at which fusion neutrons are produced by the subsequent (B) reaction, $H^3$ ($H^2$, $He^4$)n. Otherwise, the neutron economy for the system would be imbalanced due to "poisoning" caused by excessive thermal neutron captures in the $Li^6$ isotope. Such an imbalance in the cycle of neutron economy would in turn lead to an unwanted excess of tritium generation.

Furtherance of the optimum conditions for a balanced neutron economy also requires that the macroscopic absorption cross-section for thermal neutrons by both the lithium deuteroxide and the fertile elements be approximately equal. A macroscopic cross-section of 0.05 – 0.1 $cm^{-1}$ would satisfy the latter requirement for each of the above.

An estimate of the magnitude of the ratio of thermal neutrons absorbed to fast (14 MeV.) neutrons produced via the n($Li^6$, $He^4$)$H^3$ and subsequent $H^3$ ($H^2$, $He^4$) n reactions which both occur within dilute lithium deuteroxide can be gained from the following elementary analysis.

In general, the specific rate of a reaction P, between two species whose densities are N and n, is governed by the relationship $$P = N \delta n v \quad (1)$$

where $\delta$, and $v$ are the miscroscopic reaction cross-section and relative velocity of the species n, with respect to N.

The differential amount dQ, of the species n, absorbed along an element of radius dr within the small volume defined by the range R of the triton during the element of time dt is $$dQ = P\, dt \quad (2)$$

or $dQ = N \delta n\, dr \quad (3)$ since v is equal to (dr/dt).

For those reactions involving charged particles, it is more convenient to transform equation (3) into an explicit function of both the charged particle's energy E, and the stopping power (dE/dr), for the medium in which it is being stopped rather than have it remain a function only of the distance r through which it must travel while being slowed down. Thus, $$dQ = N \delta n\, dE/(dE/dr) \quad (4)$$

for the differential amount of triton absorptions (or fast neutrons produced) over the element of length, dr.

Expressed as a ratio, we find that the differential amounts of thermal neutrons absorbed, to fusion neutrons produced is $$\frac{dQ_1}{dQ_2} = \frac{\Sigma_1 n_1 dr}{\frac{\Sigma_2 n_2 dE}{\frac{dE}{dr}}} \quad (5)$$

where the subscripts 1, and 2, refer to thermal neutrons and tritons, respectively. Also, $\Sigma_1$ equal to $N_1 \delta_1$ and $\Sigma_2$ equal to $N_2 \delta_2$, are easily recognized as the macroscopic cross-sections for the absorption of thermal neutrons by dilute lithium deuteroxide, and the fusion of tritons with deuterium, in that order.

It must be noted however, that in dense matter the short range travelled by the triton circumscribes beforehand, so to speak, what effective volume must of necessity have been initially present in order to allow for the absorption of a thermal neutron by virtue of the n ($Li^6$, $He^4$) $H^3$ reaction. Hence, the range of integration for dr extends from zero to R(E) centimeters in the numerator on the right-hand side of equation (5) where E, in parenthesis, is the triton's energy.

After integrating both sides of equation (5), we finally get $$\frac{Q_1}{Q_2} = \frac{\Sigma_1 \cdot R(E)}{\int_0^E \frac{\Sigma_2(E) \cdot dE}{\frac{dE}{dr}}} \quad (6)$$

This is the ratio of the amounts of thermal neutrons absorbed to fast neutrons produced, recognizing that the conservation of particles in the (A) reaction, n ($Li^6$, $He^4$) $H^3$, demands that the number of thermal neutrons absorbed, and the number of tritons produced stand in direct correspondence with respect to one another and their associated densities. Thus, the two density terms $n_1$ and $n_2$ will cancel in both the numerator and denominator on the right-hand side of equation (5) since they are equal.

In practice, integration of equation (6) must be approximated by a summation since the integral in the denominator on the right-hand side does not exist in closed form. Thus, $$\frac{Q_1}{Q_2} \approx \frac{\Sigma_1 \cdot R(E_k)}{\sum_{i=1}^{i=k} \frac{\Sigma_2(E)_i \cdot \Delta E_i}{\left(\frac{dE}{dr}\right)_i}} \quad (7)$$

Obtaining the appropriate numerical values from the tables contained in

"Tables of Range and Stopping Power of Chemical Elements for Charged Particles of Energy 0.05 to 500 MeV.," by Williamson and Boujot (1966); CEA — R3042, Comissariat a l'Energie Atomique, France and "Controlled Thermonuclear Reactions," by Glasstone and Lovberg (1960), page 17, D. Van Nostrand Company, Ltd. (Cross-section data for fusion reactions).

and substituting in equation (7), gives the calculated value of thermal neutrons absorbed $Q_1$ to fast neutrons produced $Q_2$ as:

$$Q_1/Q_2 = 2.4 \pm 0.5 \tag{8}$$

This calculated value was empirically verified by measuring the tritium activity in equivalent samples of dilute solutions of lithium hydroxide and lithium deuteroxide. The count rate of tritium in the lithium hydroxide solution provides an indication of the amount of tritium produced by the (A) reaction, and the tritium count rate in the lithium deuteroxide solution when subtracted from that of the lithium hydroxide indicates the extent of the (B) reaction occurring in the lithium deuteroxide solution, and correspondingly, the amount of fusion neutrons produced therein.

Accordingly, four 6 ml. samples of dilute lithium hydroxide and a similar number of 6 ml. samples of lithium deuteroxide, each containing $0.0840 \pm 0.0036$ gms. of natural lithium, were made up. It was found that the concentration of 0.014 gms./ml of natural lithium was suitable for keeping all the lithium in solution. All of the samples were then irradiated in a thermal neutron flux of approximately $10^{12}$ neutrons/cm$^2$/sec and after irradiation 0.1 ml was drawn off from each. The tritium activity in each of the 0.1 ml. samples was detected by a liquid scintillating detector. The results of the measurements are presented in the following table:

| Sample (6ml volume) | Tritium Activity (cmp per 0.1 ml) Measured Count Rate |
|---|---|
| 1. D$_2$O+0.0840±0.0036 gms natural Li | 4.3423 × 10$^4$ cpm |
| 2. D$_2$O+0.0840±0.0036 gms natural Li | 4.2789 " |
| 3. D$_2$O+0.084±0.0036 gms natural Li | 3.9220 " |
| 4. D$_2$O+0.0840±0.0036 gms natural Li | 3.9729 " |
| Average for four LiOD samples | 4.1±0.2 × 10$^4$ cpm |
| 5. H$_2$O+0.0840±0.0036 gms natural Li | 6.7536×10$^4$cpm |
| 6. H$_2$O+0.084±0.0036 gms natural Li | 6.4425 " |
| 7. H$_2$O+0.0840±0.0036 gms natural Li | 6.9208 " |
| 8. H$_2$O+0.840±0.0036 gms natural Li | 6.3535 " |

$$\frac{Q_1}{Q_2} = \frac{\text{Thermal neutrons absorbed}}{\text{Fusion neutrons produced}}$$

Also:

$$\frac{Q_1}{Q_2} = \frac{\text{Average LiOH count rate}}{\text{Average LiOH count rate} - \text{Average LiOD count rate}} = 2.6 \pm 0.5$$

Clearly, good agreement does exist between the theoretically calculated value (8) and the experimentally obtained ratio of $$Q_1/Q_2 = 2.6 \pm 0.5$$

for a dilute solution of lithium deuteroxide containing 0.014 gms per ml of natural lithium.

Therefore, if dilute lithium deuteroxide in the proper concentration is combined with depleted uranium (or, thorium), then each fusion neutron (14 MeV.) which is absorbed by these materials, at and above their fission threshold energy of 1.2 MeV. is potentially capable of yielding 3.5 more neutrons from the combined (n, 2n) and fission reactions. Ideally, a multiplication of 1.5 for a generation of neutrons undergoing the exoergic (A) (B) and (C) reactions might then be expected.

However, parasitic captures, losses by leakage, increase in neutron lethargy, etc. by the fast neutrons will reduce the anticipated neutron multiplication of the above chain to something less than the ideal. Nevertheless, a proper adjustment of the atomic fractions of lithium and fertile material can lead to the construction of an optimum sub-critical assembly wherein a modest neutron multiplication of 0.8 to 0.9 can readily be achieved.

It will be seen that in addition to the deuterium isotope of hydrogen, the tritium isotope may also be used in producing a fusion reaction to obtain fast neutrons. For example, in a mixture of lithium tritide and a fertile material, the following fusion reaction can occur:

$$H^3 + H^3 \rightarrow He^4 + 2n + 11.1 \text{ MeV.} \tag{B1}$$

Accordingly, suitable lithium compounds for use in the present fuel will include any wherein an optimum concentration of the hydrogen isotope density is achieved with respect to a uniform distribution of lithium-6 atoms. In the case of a solid lithium compound, such as lithium deuteride, the optimum concentration of deuterium density can be achieved by depleting the concentration of the lithium-6 isotope below that which would normally prevail in natural lithium, i.e., 7.5 atomic weight percent lithium-6. Alternatively, if the lithium compound is a liquid, such as the dilute lithium deuteroxide of our previous example, optimum concentration of the deuterium density can be achieved via the simple expedient of adding more or less heavy water or whatever may be suitable under the circumstances. In any event, the lithium deuteride compound may be diluted to the extent that ratios between 670/1 and 1340/1 are maintained for the number of deuterium atoms to each atom of the lithium-6 isotope.

The most suitable elements for use as the fertile material are the previously cited naturally-occurring elements U$^{238}$ and Th$^{232}$. However, it is contemplated that certain of the trans-uranic elements by by-products recovered from the repossession of spent nuclear reactor fuel could also lend themselves as potential fertile material.

It will then be seen that a method and means is presented for constructing a coupled nuclear reactor embodying a nuclear fuel from which large amounts of energy, from the direct fission of the fertile material accompanied by a smaller amount of energy (10 percent of the total) from the n (Li$^6$, He$^4$) H$^3$, and fusion reactions, will make itself available for power production. In addition, those neutrons not committed to the maintenance of the multiplication chain through these reactions will henceforth lend themselves to the breeding of new fissile fuel by radiative capture in the fertile elements.

What is claimed is:

1. A method of breeding fissile fuel and producing heat using the (d,t) fusion reaction comprising carrying out such fusion reaction in a coupled nuclear reactor with a fast region containing a mixture of lithium-6, lithium-7, heavy hydrogen and a fertile material, by irradiating said fast region with a thermal neutron flux from the slow region and adjusting the atomic densities of the fast region constituents such that the macroscopic capture cross-section for thermal neutrons by the lithium-6 is equal to or less than the macroscopic cross-section for fusion of the tritons, which result from such capture, with the heavy hydrogen, and is approximately equal to the macroscopic capture cross-section for thermal neutrons by the fertile material, all of said cross-sections being in the range from 0.05 to 0.10 cm$^{-1}$.

2. The method of claim 1 wherein the fertile material is selected from the group consisting of uranium, thorium and mixtures thereof.

3. The method of claim 1 wherein the heavy hydrogen is deuterium and the mixture is adjusted to contain deuterium atoms in the range from 670/1 to 1340/1 for each atom of the lithium-6.

4. The method of claim 1 wherein the lithium and hydrogen are in the form of dilute lithium deuteroxide.

5. The method of claim 1 wherein the fast neutrons have a microscopic cature cross-section in the range of one to two barns for fission and (n,2n) capture by the fertile material.

6. A coupled nuclear reactor comprising a fast region containing a grouping of atoms consisting essentially of lithium-6, lithium-7, heavy hydrogen and a fertile material wherein the macroscopic capture cross-section for thermal neutrons by the lithium-6 is equal to or less than the macroscopic cross-section for the fusion of the tritons resulting from such capture with heavy hydrogen, and the macroscopic capture cross-section for thermal neutrons by the fertile material is approximately equal to that by the lithium-6, all of said cross-sections being in the range from 0.05 to 0.10 cm$^{-1}$.

7. A reactor as claimed in claim 6 wherein the concentration of the heavy hydrogen density is optimum with respect to a uniformly distributed source of lithium-6.

8. A reactor as claimed in claim 6 wherein the fertile material is selected from the group consisting of uranium, thorium and mixtures thereof.

9. A reactor as claimed in claim 6 wherein the grouping is adjusted to contain deuterium atoms in the range from 670/1 to 1340/1 for each atom of the lithium-6.

10. A reactor as claimed in claim 6 wherein the lithium and hydrogen are in the form of dilute lithium deuteroxide.

* * * * *

UNITED STATES PATENT OFFICE
CERTIFICATE OF CORRECTION

Patent No. 3,791,921                    Dated February 12, 1974

Inventor(s) RICHARD MYLES STANTON

It is certified that error appears in the above-identified patent and that said Letters Patent are hereby corrected as shown below:

Col. 3, line 39, each occurence, and thereafter, "$\delta$" should read --$\sigma$--.

line 42, "miscroscopic" should read --microscopic--.

Col. 4, formula (5) should read:

$$\frac{dQ_1}{dQ_2} = \frac{\Sigma_1 n_1 dr}{\frac{\Sigma_2 n_2 dE}{\frac{dE}{dr}}}$$

(that is, an equal sign should be inserted between the two expressions)

Col. 5, line 44, "(cmp" should read --(cpm--.

item 1. of the table, "D O" should read --$D_2O$--.

item 8. of the table "$H_2O$+0.840" should read --$H_2O$+0.0840--.

after item 8., insert the following line:

--Average for four LiOH samples  $6.6 \pm 0.3 \times 10^4$ cpm--

Signed and sealed this 9th day of July 1974

(SEAL)
Attest:

McCOY M. GIBSON, JR.                C. MARSHALL DANN
Attesting Officer                   Commissioner of Patents